United States Patent [19]
Cousteau et al.

[11] Patent Number: 4,630,997
[45] Date of Patent: Dec. 23, 1986

[54] APPARATUS FOR PRODUCING A FORCE WHEN IN A MOVING FLUID

[75] Inventors: Jacques Y. Cousteau, Monaco, Monaco; Lucien Malavard, Paris; Bertrand Charrier, Meudon, both of France

[73] Assignee: Fondation Cousteau, Paris, France

[21] Appl. No.: 607,386

[22] Filed: May 4, 1984

Related U.S. Application Data

[63] Continuation-in-part of Ser. No. 324,624, Nov. 24, 1981, abandoned.

[51] Int. Cl.$^4$ ............................................. B63H 9/02
[52] U.S. Cl. .................................... 416/90 A; 416/4; 416/23; 416/91; 416/20 R; 415/DIG. 1
[58] Field of Search ................ 416/4, 20 R, 90 A, 91, 416/90 R, 23, 24; 415/DIG. 1

[56] References Cited

U.S. PATENT DOCUMENTS

| Re. 18,122 | 7/1931 | Flettner | 416/4 X |
|---|---|---|---|
| 1,698,819 | 1/1929 | Massey | 416/4 X |
| 2,516,489 | 7/1950 | Stalker | 416/91 X |
| 2,759,548 | 8/1956 | Yuan et al. | 416/91 X |
| 3,062,483 | 11/1962 | Davidson | 416/90 A X |
| 3,139,936 | 7/1964 | Davidson et al. | 416/90 A X |
| 3,211,397 | 10/1965 | Laine et al. | 416/90 A X |
| 3,326,296 | 6/1967 | Hill et al. | 416/90 A |
| 3,547,377 | 12/1970 | Frey | 416/91 X |
| 3,554,664 | 1/1971 | Cheeseman et al. | 416/90 A |
| 3,588,273 | 6/1971 | Kizilos | 416/90 A X |
| 3,713,750 | 1/1973 | Williams | 416/20 |
| 4,366,386 | 12/1982 | Hanson | 416/4 X |
| 4,398,895 | 8/1983 | Asker | 440/8 |
| 4,401,284 | 8/1983 | Austin | 416/4 X |
| 4,582,013 | 4/1986 | Holland | 416/4 X |

FOREIGN PATENT DOCUMENTS

| 2729873 | 1/1979 | Fed. Rep. of Germany | 416/4 |
|---|---|---|---|
| 922773 | 6/1947 | France | 416/23 |
| 1137715 | 6/1957 | France | 416/4 |
| 60870 | 5/1981 | Japan | 416/4 |
| 193827 | 3/1924 | United Kingdom | 416/23 |
| 222845 | 5/1925 | United Kingdom | 416/4 |
| 1410175 | 10/1975 | United Kingdom | 416/23 |
| 2006885 | 5/1979 | United Kingdom | 416/4 |

OTHER PUBLICATIONS

Schlichting–Aerodynamik des Flugveugs, A. Van, Springer Verlag Berlin, pp. 264–267.

Primary Examiner—Everette A. Powell, Jr.
Attorney, Agent, or Firm—Darby & Darby

[57] ABSTRACT

A device for producing a force when in a moving fluid, such as air or water, and a method for using said device. The device may be placed in a fluid moving in a first direction for producing a force in a second direction, which is substantially transverse with respect to the first direction. The device avoids the use of large sail areas needed where the force derived from wind is proportional to said area. The device according to the invention comprises an elongated body having in cross-section a rounded symmetrical profile, which defines an elongated and rounded leading portion whose thickness increases from the front to the rear and a rounded trailing portion whose thickness decreases from the front to the rear, the leading portion being longer than the trailing portion. The device according to the invention is also provided with at least one flap, which projects from the body and which is located on the trailing portion of the profile.

56 Claims, 33 Drawing Figures

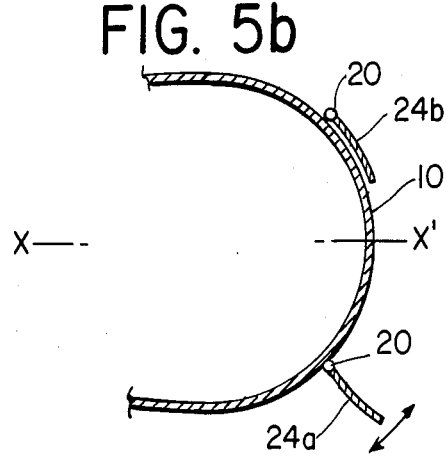
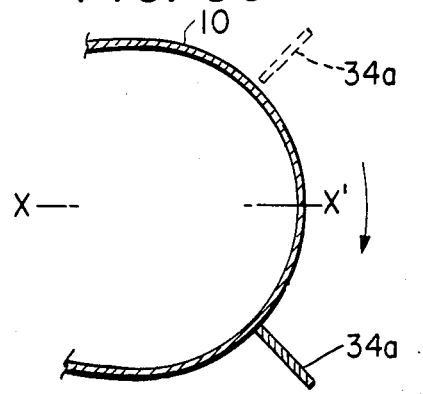
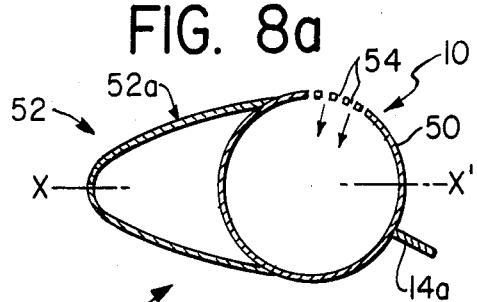
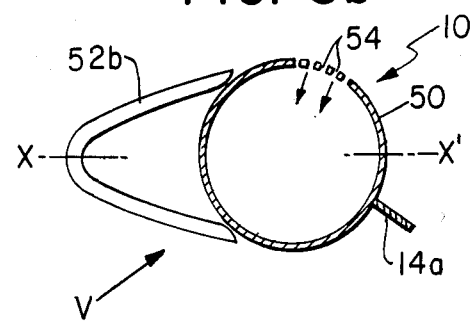
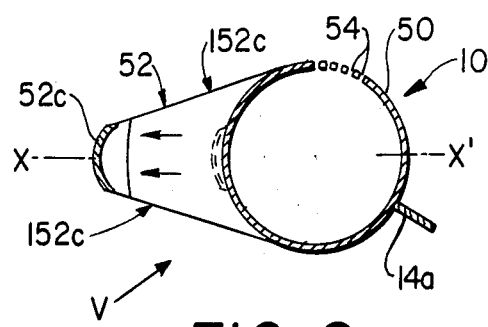
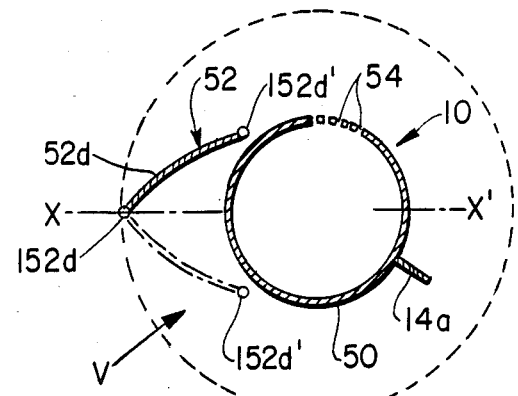
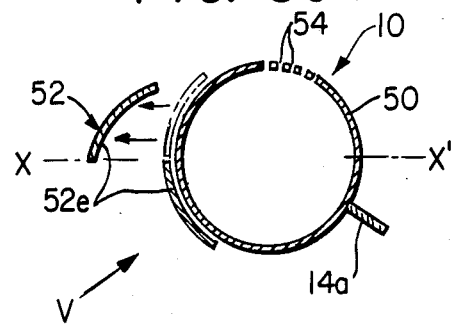

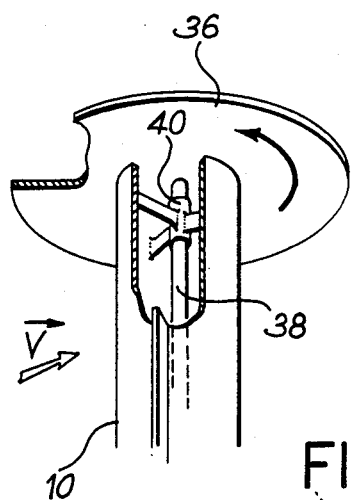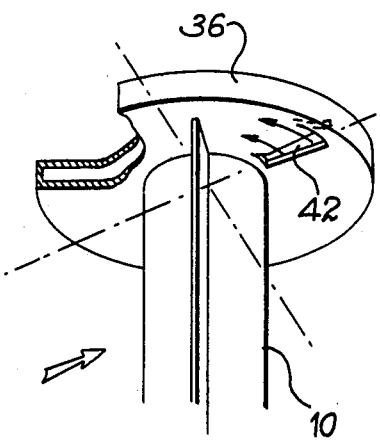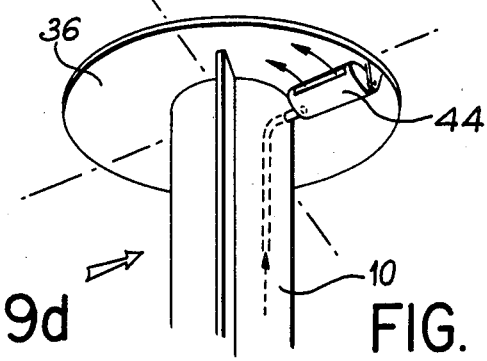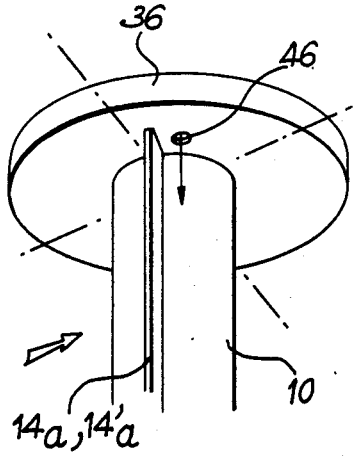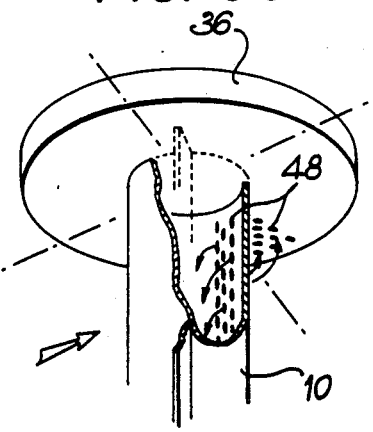

U.S. Patent  Dec. 23, 1986  Sheet 8 of 9  4,630,997
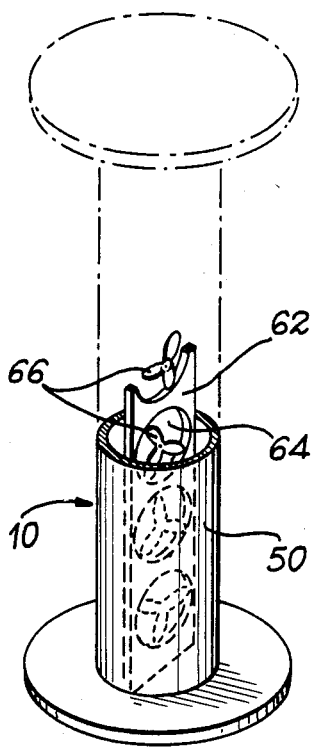
FIG. 13
FIG. 14
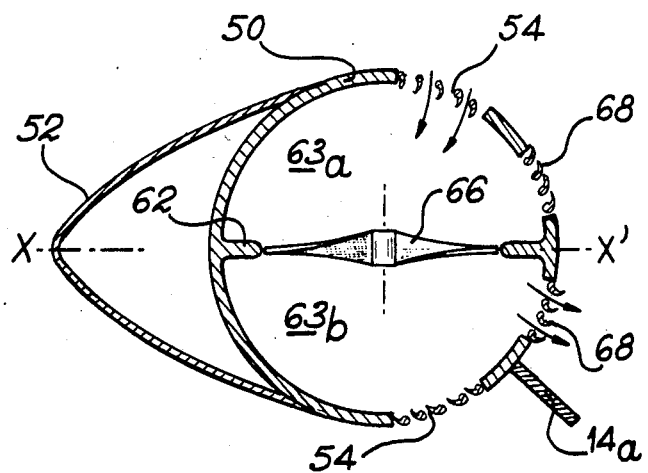

APPARATUS FOR PRODUCING A FORCE WHEN IN A MOVING FLUID

The present case is a continuation-in-part of U.S. patent application Ser. No. 324,624 entitled "Device Which Produces a Carrying Force When Place in a Fluid", filed on Nov. 24, 1981 now abandoned.

This invention relates to a novel apparatus and method for producing a useful force from a moving fluid. It relates to an active device to be placed in a moving fluid (such as air or water) in order efficiently to produce a maximum propelling force in relation to required expenditure of energy. In a preferred embodiment in the marine field, the invention may be used to attain conservation of energy resources, by providing a propulsion force for a ship in response to wind, to assist or replace other energy-consuming propulsion means for the ship. However, the invention is also useful in other fields and applications, such as with land or ice vehicles, windmills, turbines or water- or wind-driven electric generators.

The well known use of conventional sails (a passive device) to propel boats is limited by the need for large sail areas, since the force derived from wind by such structures is proportional to sail area. Efforts have been made to use active devices such as continuously rotating cylinders, utilizing the "Magnus effect" such as shown in Flettner U.S. Pat. No. Re. 18,122 of 1931, but such devices are subject to large energy consumption for the necessary driving means, as well as undesirable mechanical complexity due to the need to continuously rotate the cylinder at several hundred revolutions per minute in order to produce the desired propulsive force. Also, they suffer from operating restrictions in that the cylinder must be stopped and reversed to change direction.

In particular, the present invention constitutes an improvement over the type of "wind motor" described in Von Karman et al. U.S. Pat. No. 2,713,392, granted July 19, 1955, and attains a major improvement in useful force output and further attains a significant increase in energy efficiency in relation to energy necessarily expended to obtain that useful output.

In general, the present invention utilizes a stationary but orientable hollow body, in the shape of a tubular column or cylinder, preferably of special cross-sectional shape (i.e., profile). The hollow body has particularly arranged fluid permeable regions (e.g., apertures) through which fluid is aspirated by a suitable fan or suction device. An adjustable control vane or flap provides an additional parameter permitting attaining greatly improved ratio of output force to input energy as well as providing for flexibility of operation of the device.

To better understand the invention, the following discussion is given of some basic principles in connection with FIG. 1 of the accompanying drawings, which is a diagram explanatory of certain principles on which the invention is based.

FIG. 1 of the attached drawings illustrates that a device (such as a sail on a boat) placed at M in a fluid (such as air) moving at a relative velocity V with respect to the device is subject to a force F, which may be resolved into a drive force P perpendicular to the fluid velocity vector V and a drag force R directed in the same direction as the velocity vector V. If the device at point M moves in a direction A forming an incidence angle α with the velocity vector V, it is subject to a propulsion force T corresponding to the projection of drive force F in that direction A. Thus, for a given value of incidence angle α, between the wind direction and the course of the boat, the intensity of the propulsion force T increases in proportion to the drive force P, and the drag force R is reduced when α is below 90°.

In general, drive force and drag are expressed by dimensionless coefficients Cz and Cx given by the following formulas:

$$Cz = \frac{P}{\frac{1}{2}\rho V^2 S}$$

and $$Cx = \frac{R}{\frac{1}{2}\rho V^2 S}$$

in which P is the drive force (corresponding to aerodynamic lift,) R is the drag force, ρ designates the density of the fluid, V is the fluid velocity S is the surface area of the device as projected on a plane perpendicular to the direction V in which the fluid moves. Cz and Cx are the well-known coefficients of lift and drag ($C_L$ and $C_D$) when applied to airfoils.

Taking account of these expressions, it is apparent that the propulsion force T is expressed by the following formula:

$$T = \tfrac{1}{2}\rho V^2 S(Cz \sin\alpha - Cx \cos\alpha).$$

This formula clearly shows that, for a given fluid velocity V and for a given orientation for the propulsive force T, the higher the product S times Cz, the higher will be the propulsion force.

If these results are applied to traditional devices which create a drive force without an external supply of energy (such as the wings of aircraft, the sails of boats, the blades or sails of windmills, etc.) the coefficient Cz is virtually always below 1.7, but may be 2.2 for the wing of an aircraft with flap, and 2.7 with hypersustenation devices. It is apparent that the creation of a high propulsion force T requires surfaces which are too large and cumbersome to be used in practice.

It is known to produce very high drive forces P or coefficients of lift Cz by using an active device which uses an external energy supply. Thus, according to the so-called Magnus effect, as described in the Flettner patent mentioned above, by rotating a circular cylinder about its axis and placing it in a fluid flowing around the cylinder, the resulting deflection of the fluid flow produces a high force on the cylinder, in a direction depending upon the speed and direction of cylinder rotation. The rotation of the circular cylinder also delays and reduces the separation of the fluid flow from the cylinder surface and the amount of turbulence obtained.

However, although the Magnus effect makes it possible to produce high values of coefficient Cz, the circumferential rotation speeds of the cylinder required to produce such a result cause considerable mechanical complication and require substantial power; it should be borne in mind that the dimensions of the cylinder must be, for example, of the order of 3 meters in diameter and 15 meters in height in order to be adequate for propulsion of a relatively small boat (i.e. 30 meters in length). These mechanical complications are particularly linked with vibrations, gyroscopic effects, etc. produced by the rotation of such a cylinder, which can reach a necessary rotation speed of 400 r.p.m. when the wind speed is high. Moreover, in the application of this arrangement to the propulsion of a boat or ship, it is apparent that if it is desired to reverse the direction of the propulsion force, it is necessary to reverse the cylinder rotation direction, which takes a relatively long time because of its inertia.

Some of these disadvantages were sought to be overcome in Von Karman U.S. Pat. No. 2,713,392 of 1955 in which a vertical circular cylinder on a ship was suggested for propulsion, where the cylinder was made permeable to air, which was aspirated or sucked into the cylinder to maintain air flow around the cylinder surface. A short deflector caused the separated air streams around the cylinder to have different-length paths, resulting in a transverse force on the cylinder. However, it is understood that this structure, during wind tunnel tests in France, more than 20 years ago, failed to attain a value of coefficient Cz over about 2.4, resulting in an impractical device. Similar principles were suggested theoretically in the even earlier British Pat. No. 222,845 issued May 7, 1925 to N.V. Instituut Voor Aero-en-Hydrodynamiek, but failed to result in a practical structure.

BRIEF SUMMARY OF THE INVENTION

The object of the present invention is to provide an active device which produces a very high drive force, with values of Cz from 5 to 8, with a minimum requirement for external energy supply, and without having the disadvantages of prior art devices such as the rotating circular cylinder utilizing the Magnus effect. Obviously, devices according to the invention can be used in many applications, such as in the propulsion of a moving object such as a ship, or in the production of useful mechanical energy from fluid movement, which energy can for example be transformed into electrical energy by means of a generator. It is possible to obtain benefits from the invention not only from wind energy, but also river or ocean currents or tidal flow, or any fluid flow, such as in turbines. Although useful with fluids other than air, the invention will be particularly described with respect to the flow of air (wind), as to which the drive force may correspond to the lift of an airfoil.

While the present invention uses basic physical principles which correspond in some measure to those involved in the aerodynamics of airplane airfoils, (i.e. wings or helicopter blades), the conditions under which these principles are used here are quite distinct and different from airfoils. The present invention is particularly useful with respect to low fluid speeds, such as under fifty knots, whereas aircraft airfoils are generally concerned with much higher speeds. In addition, airfoils are primarily concerned with maximum lift, and essentially disregard the question of conservation of energy. In contrast, in the present case, the primary consideration is energy conservation, to produce a maximum drive force in relation to energy expended. Also, airfoil design is deeply concerned with factor of drag, and strong efforts are made to optimize the ratio of coefficient of lift ($C_L$ or Cz) to coefficient of drag ($C_D$ or Cx). In contrast, drag is not so significant here, particularly in marine applications, where resistance of a hull to movement through water greatly overshadows any fluid drag on the propulsion device.

In the case of airfoils, the coefficient of lift during normal operation may be in the range of 0.2 to 0.3. This may be increased to a value of 2.5 to 3.0 when flaps are extended during landing. The coefficient of drag Cx has values of the order of 0.01, giving a suitably high ratio of Cz to Cx.

The present invention in contrast provides values of Cz of from 5 to 8, which is an indication of the drive force attained. Effectiveness may be measured in terms of the energy expended in converting the fluid flow into a drive force, which is indicated by a coefficient of energy (CA). This has no significance for airfoils on airplanes.

In the present invention, for reasonable expenditures of energy CA should be below 0.2. As will be seen, in the useful range for CA from 0.1 to 0.2, the present invention produces values of Cz (and hence corresponding drive forces) of from 5 to 8, far above values attained by airfoils for airplanes.

The present invention proposes a device which is to be placed in a fluid moving in a first (fluid) direction in order to produce a drive force in a second (drive) direction which is transverse with respect to the fluid direction, where the device comprises an elongated hollow body (such as a tube or cylinder or conic column) having a cross-section in the plane of fluid direction (i.e., a profile) which is rounded and symmetrical with respect to an axis which defines an angle of incidence with the fluid direction. The symmetry of the profile and of all pertaining equipment (such as apertures or flap described below) is imposed by the necessity in case of an application of a ship to take advantage of wind coming from either side of the vessel. The profile preferably has an elongated leading portion whose width increases from the front toward the rear and a trailing portion whose width decreases from the front to the rear. The profile is "thick", i.e., preferably has a maximum width of the profile between 50 and 100% of its length in the direction defined by its axis of symmetry. The device also comprises means for controlling flow of the boundary layer of fluid over the surface, preferably by producing a substantial pressure reduction or vacuum at the surface of the body (for example, by suction or aspiration through a fluid-permeable region of the surface) at least in an area located on the trailing portion of the profile on the side toward which the transverse drive force is directed (i.e., the leeward side). Additionally means are provided in the trailing portion for separating the two fluid streams produced on the two sides of the outer surface of the body, the means being located on the side facing the direction from which the fluid is flowing, i.e. the windward side.

These features of the invention contribute to the production of a propulsion device which can easily be realized and make it possible to create useful high drive forces for a particularly low expenditure of energy.

These advantages result in part from the thick nature of the symmetrical body profile and from the elongated shape of the leading portion of the profile, which make it possible to limit the permable region for producing aspiration to a very small zone of the profile, which considerably reduces the expenditure of energy needed in the device. Thus, it is necessary to produce aspiration (i.e. suction) only when the speed of the fluid boundary layer on the outer (i.e. leeward) surface of the body is such that the air stream tends to leave the surface and create turbulence, or, in other words, when the pressure gradient becomes positive. However, it has been found that the elongated shape of the profile (particularly the leading portion of the profile) makes it possible significantly to retard this condition and consequently to limit to a relatively small zone the outer surface flow region in which it is necessary to provide aspiration, and to limit the aspiration flow rate as well as the degree of vacuum at the surface of the body.

The particularly remarkable performance levels of a device according to the invention also result from the combination of a suction means with the thick profile of the body in the case of the preferred embodiment, to produce high vacuum or pressure reduction by sucking fluid into the body at the permeable zone. The thickness of the profile is also advantageous since it defines a sufficiently large suction chamber for the internal pressure to be readily reduced to a small level, thus reducing losses due to loading the air movement, and thereby contributing to the reduction of flow losses and expenditure of energy for the device.

Furthermore, the establishment of separation for the stream on the outer (leeward) and inner (windward) surfaces around the hollow body, which is preferably carried out by means of a particularly located and diminsioned vane or flap (i.e. without any other energy expenditure), makes it possible to prevent the formation of parasitic eddies or turbulence, which otherwise would tend to reduce the drive force for a given energy input level.

Thus, it is apparent that the several characteristics of a device according to the invention are combined to bring about surprising useful results. By way of example, when the body defines a projected surface area of 150 square meters, it is possible, by using a 90 h.p. motor for producing the aspiration vacuum, in a wind of 12 meters per second (24 knots), to ensure the propulsion of a boat at a maximum speed of 14 knots in the most favorable case, where the angle $\alpha$ formed by the direction in which the ship is moving with respect the wind direction is approximately 60°. For comparison, in order to achieve the same results, a sail would have to have a surface area of approximately 1000 square meters, making it necessary to considerably increase the overall dimensions of the ship, as well as the number of persons and systems required for operating it.

In order to illustrate the energy economies obtained by means of the device according to the invention, it should also be noted that, in the above example, the performance levels indicated hereinbefore in the case of a device according to the invention would require an engine of approximately 1200 h.p. in the case of a ship equipped with conventional propulsion means.

Finally, it is obvious that the use of a device which remains substantially stationary with respect to the ship makes it possible to eliminate mechanical problems inherent in rotating cylinder devices using the Magnus effect.

According to another preferred feature of the invention, means may be provided for automatically orienting the axis of symmetry defined by the profile of the body to the proper incidence angle relative to the fluid direction.

In practice, according to the invention, in one form the profile of the elongated body may have a trailing portion as a semi-circular arc and an elongated rounded leading portion increasing in width from the leading edge toward the rear. In another form, the leading portion may be shaped as a half-ellipse smoothly merging into the semi-circular arc. In still another form, the trailing portion may be a smaller circular arc, with the rest of the profile in a generally elliptical shape, greater than a half-ellipse, and smoothly joining the arc.

In actual construction, the elongated leading portion may be constituted by a fairing, which in section can have the shape of a semiellipse, parabolic arc, or other smooth generally oval form. To ensure that the device is not damaged when placed in a moving fluid flowing at a much higher speed than normal, it is possible either to give the device increased strength or to equip the device with at least one retractable part at its elongated leading portion, which can reduce the total surface area of the body.

According to the invention, different constructions can be envisaged for retractable parts. Thus, if the elongated body comprises a rigid cylindrical envelope defining the trailing portion, it is possible to produce the leading portion either by means of a flexible, inflatable envelope having a single or double wall, or by means of a moving ferrule which can move radially relative to the cylindrical envelope and which is connected to the latter by flexible partitions, or by means of a flexible beak-shaped projection placed between two supports, such as masts or lines which are substantially parallel to the axis of the cylindrical envelope and which produce a gap effect, or by means of a rigid beak-like projection, which is radially movable with respect to the envelope. Finally, the elongated body assembly may be telescopic and may comprise a plurality of rigid parts or at least one part made from a flexible material in such a way that its length can be reduced at will.

It is obvious that these features make it possible to improve the performance of the device under unfavorable high fluid velocity operating conditions, because the retraction of the elongated leading portion can at any desired time reduce the effective cross-section of the body placed in the moving fluid.

As appropriate, the means for producing the boundary layer control on the leeward surface may comprise in combination or separately means such as a fan for sucking fluid into the body and/or means for blowing fluid in a direction which is substantially tangential to the body in the direction of outer surface fluid flow.

In a comparable manner, the means for separating the outer surface and inner surface fluid streams may comprise either a flap or vane projecting outwardly with respect to the body, or a means for blowing the fluid out of the body and placed in the outer surface fluid flow, inclined in the direction of that flow. The flap may be either straight or curved inward and the blowing means may be either radial, inclined or tangential and may be associated with the flap in order to accelerate the outer surface fluid flow in the vicinity of the flap.

In order to permit a reversal of the direction of the drive force, the various members may be duplicated, one being retracted or disabled when the other is in use and both positioned symmetrically with respect to the axis of symmetry defined by the body. Alternatively, the means may be in the form of a single member able to move with respect to the body to either side of its axis of symmetry.

According to another feature of the invention, an end plate or equivalent structure is preferably provided at each of the ends of the hollow body to limit the unfavorable effects of marginal eddies or turbulence. In order to further increase the efficiency of the device, each of the end plates may have a circular part rotating in the direction of the outer surface fluid flow, or may be provided with suction means or blowing means which are tangential, perpendicular or inclined with respect to the end plate surface.

According to a particularly economic combination of these various features, vacuums are created at the surface of the elongated hollow body by using suction means positioned within the body, the separation of the inner and outer surface fluid streams being provided by means of a vane or flap arranged substantially radially with respect to the elongated body, with end plates provided at the ends of the elongated body. According to one embodiment of the invention, the suction means may comprise at least one fan, whose axis is parallel to the longitudinal axis of the elongated body. The fan or fans are placed within the body respectively in the vicinity of each of its ends in order to suck the fluid towards the interior of the body over the entire distance separating the ends and to blow the fluid towards the outside through each of the end disks. This solution is particularly appropriate in the case where the elongated body is telescopic. However, it can also be used with all the other constructional variants of the fairing. Preferably, blowing takes place radially on an arc of the periphery of each of the end plates and on the trailing portion side. The blowing cross-section is sufficiently large so as to minimize the pressure drop, which would otherwise increase the energy consumption.

According to a second embodiment of the invention, a partition extends longitudinally within the elongated body in order to define two compartments communicating with one another by circular openings. Fans are placed in these openings to suck the fluid into one of these compartments comprising the suction zone and to blow fluid into the other, comprising a blowing zone, placed in the fluid stream in the vicinity of the flap. Preferably, the axes of the fans are perpendicular to the axis of symmetry of the profile on which the partition is arranged. In order to permit a reversal of the drive force direction, two suction zones and two blowing zones are provided, arranged symmetrically with respect to the axis of symmetry of the profile, and means are provided for covering permeable zones not corresponding to the drive force direction which it is desired to create. The permeable zones may then comprise pivoted panels formed on the surface of the body, able to open towards the inside of the latter, the blowing means then comprising pivoted panels formed on the surface of the body and able to open towards the outside of the body. In this configuration, the suction and blowing panels open and close alternately, as a function of the operation of the fans and as a function of the pressure reduction or vacuum and overpressure created by the fans on either side of the partition, or by mechanical means.

BRIEF DESCRIPTION OF THE DRAWINGS

The invention is described in greater detail hereinafter relative to illustrative embodiments and with reference to the attached drawings, wherein:

FIGS. 5a to 5c are diagrams showing alternative embodiments of deflector flap arrangements in the embodiments of the present invention.

FIGS. 8a to 8e show diagrammatically and in cross-sectional form arrangements of fairing useful in forming the device shown in FIG. 3, said fairing in some instances being retractable when the wind or current in which the device is placed reaches an excessively high value.

FIGS. 9a to 9e show diagrammatically various arrangements of plates preferably placed at the ends of the elongated hollow body of a device according to the invention, the profile of the body being shown as circular to simplify the description.

FIG. 13 show a perspective view partly in section of another embodiment of the invention, in which the fans are arranged over the entire length of the body, the axes of the fans being illustratively disposed in the same plane and perpendicular to the axis of symmetry of the elongated body profile.

FIG. 14 shows a cross-sectional view of the body of the device shown in FIG. 13.

DETAILED DESCRIPTION OF THE PREFERRED EMBODIMENTS

Figure 2A:
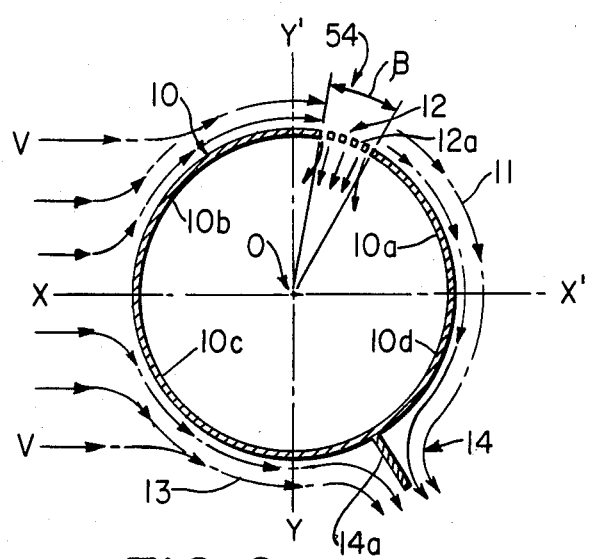
FIGS. 2a is a diagram of fluid flow around a rounded body, useful in explaining the principles of the invention.

As stated above, the invention includes a device adapted to be placed in a fluid flow moving at a velocity V, the device preferably having an elongated generally tubular body with a cross-section in the direction of the fluid flow in the shape a thick, symmetrical, rounded profile whose leading portion is elongated. However, to simplify the description and explanation of the principles of the invention, a body 10 is shown in FIG. 2a which has a circular profile. This profile is to be understood to be shown as circular for explanatory purposes only, and according to one feature of the invention actually is preferred to have a shape similar to that of FIG. 3 and others, described below.

As illustrated in FIG. 2a, a fluid flow (e.g. wind) of velocity V may be directed along an axis X-X' of the profile. This axis X-X' with a transverse axis YY' divides the profile into four quadrants 10a, 10b, 10c and 10d, here designated as the first through fourth quadrants, respectively. Quadrants 10b and 10c form a leading portion of the profile, impinged first by the fluid flow, while quadrants 10a and 10d form a trailing portion of the profile. The fluid flow will divide into two streams as viewed in FIG. 2a; these are an outer (leeward) stream 11, and an inner (windward) stream 13. To create a differential pressure which provides a resultant lift-type drive force P (FIG. 1) on the elongated body 10 in the transverse direction Y-Y', two main features are provided.

An arrangement designated schematically at 12 is provided for producing a vacuum or reduced pressure within the hollow body 10, substantially at quadrant 10a of the profile, on the leeward side (shown in the figure as the upper side) of the trailing portion of the profile. This is done by providing a fluid-permeable (e.g. apertured) region 54 of angular extent $\beta$, in the wall of the body 10 and providing suction means, such as a fan inside the body, to draw fluid into body 10, as described below. The permeable region 54 is provided at about the position where an air stream 11 would normally separate from the body surface. The permeable region 54 and suction means serve to keep the air stream 11 flowing around the outer surface of the profile, with minimal turbulence. In addition, a second stream flows around the other (inner) surface of the profile.

In addition, means in the form of a vane or deflector flap 14 is provided for separating the outer fluid stream 11 from the inner stream 13 on the outside of body 10. The vane 14 is also placed on the profile trailing portion, but on the inner (windward) side of the latter (i.e. at quadrant 10d) opposite the permeable region.

Figure 1:
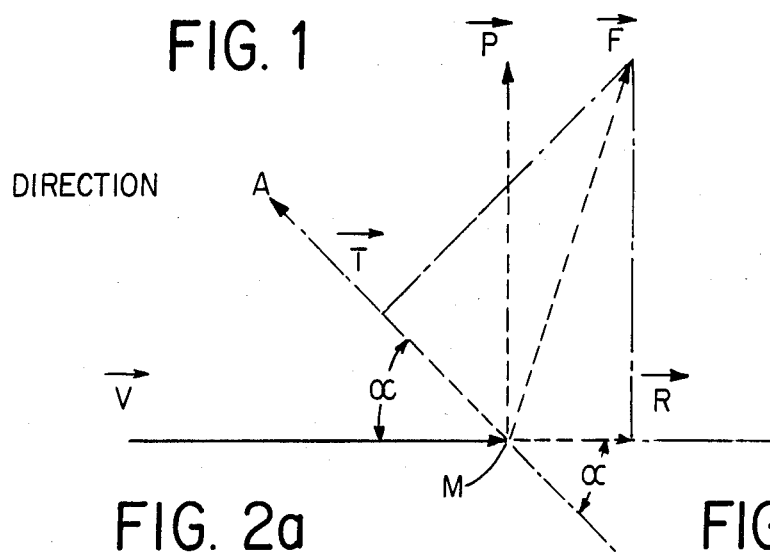
FIG. 1, already described, is a vector diagram, showing the resulting propulsion force T to which a device placed at point M and moving in a direction A at an angle α to the wind is subject, where the device creates a transverse drive force P and experiences a drag force R when placed in a wind or fluid flow of velocity V.

As shown in FIG. 1, such an arrangement creates a drive force P in the direction YY', transverse to the direction of fluid flow V. If the device M is considered to be like an airfoil in a wind stream V, then the force P would be a lift force, and the force R would be the drag force on the airfoil. Special features of the present invention produce values of lift coefficient Cz of between 5 and 8 for a minimal energy expenditure, as described in more detail below.

Figure 2B:
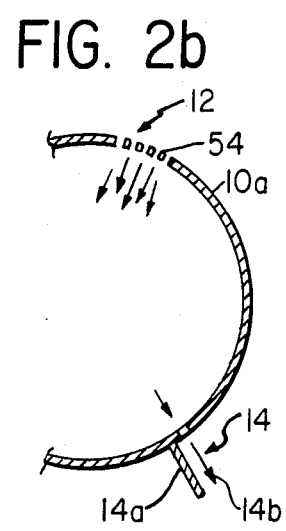
FIGS. 2b–2d are fragmentary diagrammatic cross-sectional views of hollow bodies showing various ways of separating the outer (leeward) and inner (windward) fluid streams.

The constructional variant of FIG. 2b differs from the form of FIG. 2a in that, in addition to flap 14a, the means 14 for separating the outer and inner fluid streams comprises means indicated diagrammatically by arrow 14b for blowing the fluid outward of body 10 in a substantially radial direction in the vicinity of flap 14a and on the leeward side of flap 14a where the outer fluid flow occurs.

According to another variant, not shown, flap 14a may be curved inwards so as to have a concave surface on the outer surface of fluid flow. The blowing means then acts in a direction which is substantially tangential with respect to body 10 and in the direction of the outer surface fluid flow.

Figure 2C:
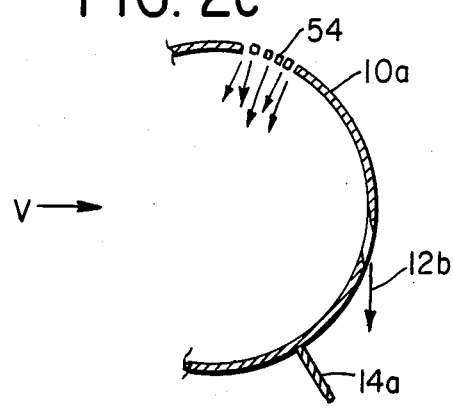

The constructional variant of FIG. 2c has the components of the embodiment of FIG. 2a and in addition the means 12 for producing a vacuum generally in the first quadrant 10a also comprises blowing means, diagrammatically indicated by an arrow 12b, which acts substantially tangentially of the profile between the suction means 12a and the flap 14a in the direction of the outer surface fluid flow.

According to another embodiment, not shown, the features of the forms of FIGS. 2b and 2c may be combined. In the same way, several tangential blowing means like means 12b may be used between suction means 12a and flap 14a.

In another constructional variant, also not shown, a vacuum is produced generally acting on fluid flow around the first quadrant 10a by blowing means like means 12b in FIG. 2c. Obviously, this variant can be combined with any of the possible constructional variants of means 14 for separating the outer surface and inner surface fluid streams.

Figure 2D:
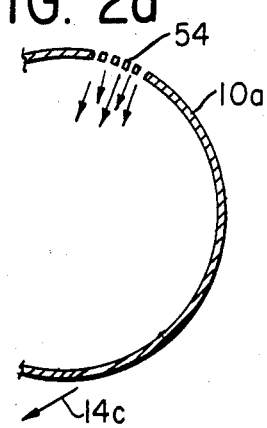

FIG. 2d shows another constructional variant of the invention, according to which the means for separating the outer and inner surface fluid streams do not comprise a flap. Instead, only the blowing means 14c is used, which acts generally in the fourth quadrant to blow fluid outwardly from body 10 in a direction which is substantially tangential with respect to body 10 at the inner surface fluid stream and in the direction of that stream.

Thus, the vacuum or pressure reduction which causes the outer fluid flow to follow the profile can be obtained by any of the previously described means and in particular by the suction means 12a, as illustrated in FIGS. 2a through 2d.

Figure 3:
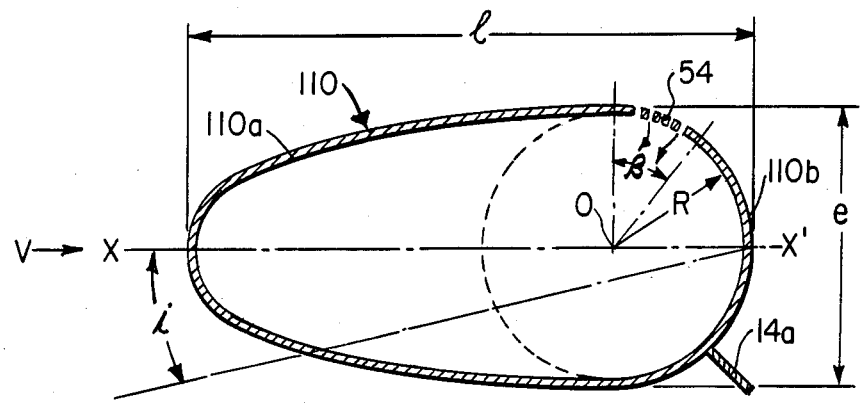
FIG. 3 shows diagrammatically and in cross-sectional form, one embodiment of the invention.

FIG. 3 shows a feature of the invention important in attaining the advantages of the invention, according to which (despite what is illustrated FIG. 2a) body 110 has a thick, rounded profile, which is symmetrical with respect to an axis XX'. More specifically, as shown in FIG. 3, the profile of this body 110 has an elongated leading portion 110a, whose thickness increases from front toward the rear, and a trailing portion 110b whose thickness decreases from the front toward the rear. In this embodiment the leading portion approximates a half-ellipse, but may have other smooth forms (e.g. parabolic or oval), while the trailing portion is preferably semicircular.

In one specific form, the trailing portion of the profile is essentially a half-circle, with a diameter equal to the maximum width of the profile. The leading portion is preferably a half-ellipse although other smooth curves could be used. If e is the maximum width of the profile and 1 its length or chord, the ratio e/1 is in this instance slightly more than 0.5, but may be between 0.50 and 1.00.

By using such a profile, the drive force P may be increased by inclining the axis XX' of symmetry of the profile with respect to the direction of the fluid flow (e.g. the apparent wind) through an angle of incidence i in the direction which it is desired to give to the drive force P. Moreover, the elongated shape of the profile leading portion delays the separation of the fluid streams from the body, making it possible to reduce the area of the permeable region 54 and consequently the required suction power, leading to a further increase in energy conservation.

FIG. 3 shows a device equipped both with a permeable region 54 and flap 14a, as in the case of FIG. 2a. This arrangement produces a high ratio of drive force P to suction energy expended. However, it will be understood that any of the various suction arrangement of the embodiments of FIGS. 2b to 2d may be applied to the non-circular profile of FIG. 3.

In an advantageous embodiment, of which FIG. 3 is representative, the means 14 for separating the two surface fluid streams 11 and 13 is constituted by a planar, rigid flap 14a disposed outside and substantially radially with respect to body 110. Since the coefficient Cz increases with length of the flap, preferably the length of flap 14a is at least R/2 (where R is the radius of the semi-circular trailing portion 110b of body 110) up to a length R, beyond which essentially no advantage is attained. Stated differently, the flap 14a preferably extends to a point below the lowest point of the profile as seen in FIG. 3. This arrangement is particularly advantageous when the permeable area 54 is located about at the point where there would otherwise be a separation of the outer fluid stream from the body, i.e. near the start of the trailing portion 110b on the outer surface shown in FIG. 3. This location occurs between about 65° and 150° from axis OX (O being the center of the circle defined in section by the envelope 110 and the angles being measured in a clockwise direction). In practice, the permeable area 54 may be even further reduced, as shown in FIG. 3, to an an angle $\beta$ of about 45° centered at about 110° from OX so that the permeable area extends from about 85° from OX to about 130° from OX. In other words the permeable area 54 extends between 60% and 90% of the chord, as measured from the leading edge.

The permeability of area 54 to fluid flow (i.e., porosity) need not be the same throughout, and may optionally be adjustable, as disclosed below. It preferably is selected to be between 20% and 50%. Moreover, permeable area 54 may comprise two or more separate areas located between the angle limits mentioned. This situation is particularly advantageous in the case of limited suction flow rates. Also, the internal pressure to be produced within body 10 or 110 should be at least as low as the external pressure less the pressure drop across the permeable area 54 and other flow losses. However, for obvious reasons of energy economy, the suction power is limited to only the power necessary for the suction of the boundary fluid layer.

In addition, flap 14a is preferably inclined relative to axis OX' (on the side of axis XX' opposite to permeable area 54; i.e. on the windward side) at an inclination angle relative to axis OX' of between 35 and 45 degrees, when it is desired to obtain a high coefficient Cz, and between 15 and 25 degrees, when it is desired to improve the maximum value of the ratio between the coefficient of left Cz and the coefficient of drag Cx. There is preferably a single flap 14a, made movable as described below so it can pass from one side to the other of axis XX' (as described below) in accordance with the direction which it is desired to give the drive force.

Obviously, the variants of suction arrangements described diagrammatically above are in no way limitative, and may be used in FIG. 3 individually or combined. As further examples, FIGS. 4a to 4d show various embodiments of the suction arrangement which may be used according to the invention. These suction arrangements should be able to produce a vacuum or pressure reduction either substantially in the first quadrant 10a, or substantially in the fourth quadrant 10d, according to the direction which it is desired to give to the drive force P. They make it possible to prevent separation of the thin outer (i.e. leeward) fluid stream or boundary layer at the trailing portion of the body surface and limit turbulence.

Figure 4A:
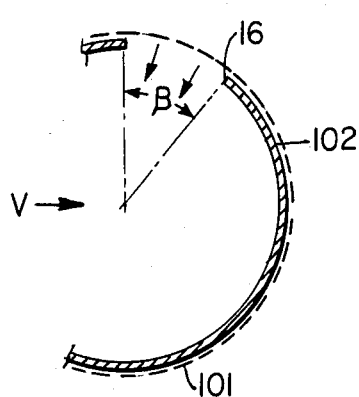
FIGS. 4a to 4d are diagrams showing alternative suction arrangements useful with various embodiments of the invention.
Figure 4B:
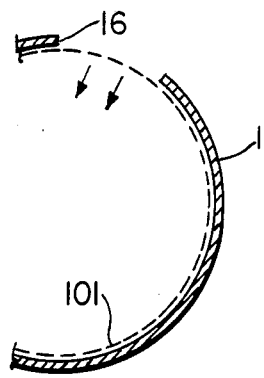

To this end, FIGS. 4a and 4b show that body 10 may comprise a fluid-permeable envelope 101 and an impermeable envelope 102, the latter having over part of its circumference a slot 16, whose width defines the permeable area angle $\beta$ (cf. FIG. 2a). In the embodiment of FIG. 4a, the permeable envelope 110 is placed outside the impermeable envelope 102, while this situation is reversed in the embodiment of FIG. 4b. The permeable envelope 101 may comprise a porous or perforated wall or a system of meshes, gratings, slots, etc. The permeable region $\beta$ is preferably located in the first quadrant, but may also extend into the second quadrant up to an extent of about 25°. Obviously, the situation is reversed when it is desired to reverse the direction of the drive force, and the permeable region is then at the fourth quadrant, with possible extension into the third quadrant. To this end, the fluid-impermeable envelope 102 may be made orientable, so as to be able to move the slot 16 from the first quadrant into the fourth quadrant.

Figure 4C:
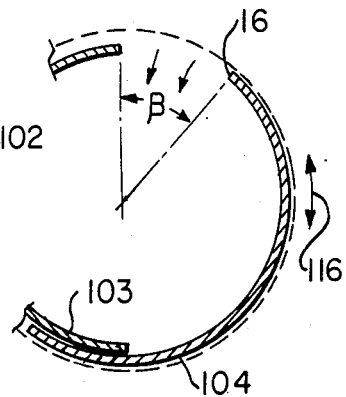

The constructional variant of FIG. 4c constitutes an improvement over the forms of FIGS. 4a and 4b, permitting an adjustment of the angle $\beta$ during operation. To this end, the fluid-impermeable envelope 102 is in fact constituted by two envelopes 103 and 104, with at least one being orientable. Thus, if envelope 104' is symmetrical to axis XX', a displacement of envelope 103 as schematically illustrated at 116 makes it possible both to modify the width of slot 16 and to displace that slot from the upper body portion (as seen in the drawing) to the lower body portion and vice versa.

The variant of FIG. 4d makes it possible, in the manner described below, to simultaneously orient the operative permeable area and the flap in a single operation, when it is desired to change the direction of the propulsive force. In this form, hollow body 10 comprises a fixed inner envelope 105 (which is impermeable except at the permeable areas 54 and 54'), and an outer, orientable, impermeable envelope 106 acting as a cover or shutter, whose displacement makes it possible to cover one or other of the permeable areas 54 or 54'.

According to a variation not shown, the permeable area may be formed as a gate in the envelope of body 10 and opening towards the inside of the latter.

Figure 5A:
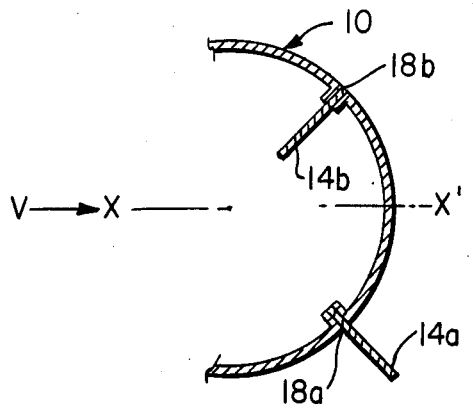

It will be understood that if the drive force is to be reversed in direction (as when the fluid flow changes direction), then the quadrant positions of the flap 14 and the apertured region 54 should be interchanged. FIGS. 5a and 5b show two constructional variants of multiple flaps, which can be used in the embodiment of FIG. 3 to accomplish a reversal of quadrant between first and fourth quandrants, for the flap 14. As seen in FIG. 5a, a device according to the invention may comprise two radial, planar flaps 14a, 14b arranged symmetrically with respect to axis XX'. As can be seen, each of flaps 14a, 14b can be withdrawn into a respective radial slot 18a, 18b formed in body 10, in order to be completely retracted with respect to the body profile. More specifically, when one of the flaps 14a or 14b is extended, the other flap is retracted and vice versa. This aids in reversing the direction of the drive force P.

FIG. 5b shows another constructional variant of flap according to which, and as in the previous variant, two flaps 24a, 24b are arranged symmetrically relative to axis XX'. Each of the flaps is pivotably mounted on body 10 along a generatrix 20 of the latter, so that it can be turned down onto body 10. The flaps may have a planar or inwardly curved shape, so as to closely adapt to the profile of body 10 in order not to impeded the flow of the fluid around body 10. As in the variant of FIG. 5a, one of the flaps 24b is turned down onto body 10, while the other 24a is placed in the active position, and vice versa, as a function of the direction which it is desired to give to the drive force P.

FIG. 5c shows another variant of a planar, radial flap 14a, a single flap being mounted on body 10. Flap 34a is mounted so that it can move about the axis of body 10 in such a way that it can be angularly adjusted, and can move between the fourth quadrant and the first quadrant, as a function of the direction which is to be given to the drive force.

Obviously, other flap constructions may be used. In particular two inflatable flaps could be positioned symmetrically with respect to axis XX', the flaps being inflated in alternating manner as a function of the direction of the drive force to be created by the device.

The pseudo-radial or radial blowing means 14b (FIG. 2b) act like a fluid flap between the outer and inner surface fluid streams, while accelerating the outer surface fluid stream. Pseudo-tangential or tangential blowing arrangements 12b, 14c (FIG. 2c and 2d) entrain the thin fluid streams which have lost their energy by friction against the wall of the body 10 and entrain the other fluid stream layers by an induced effect.

Figure 4D:
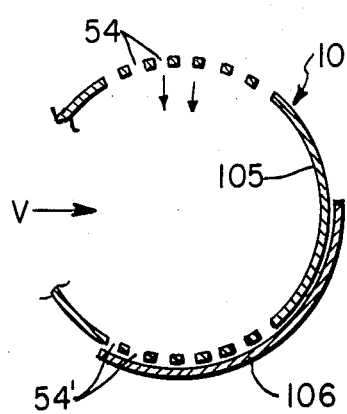
Figure 6:
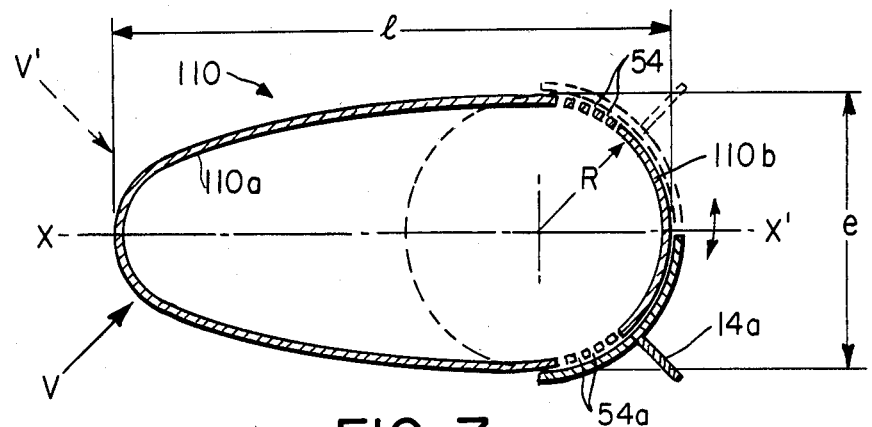
FIG. 6 shows diagrammatically in cross-sectional view another embodiment of the invention, incorporating an arrangement for reversing the drive force.

The variant of FIG. 5c may be used with that of FIG. 4d as shown in FIG. 6. Here the body 10, of the shape of FIG. 3, preferably has a semicircular trailing portion 110b. Two permeable regions 54, 54a are formed in body 10, preferably symmetrically about axis XX', and positioned and dimensioned as described above. A one-piece circular arc-shaped outer envelope or shutter 106 (as in FIG. 4d) is arranged on the exterior of the body 10 so as to be movable, to adjust the angular extent of one permeable region 54 or 54a while blocking the other, as in FIGS. 4c and 4d. The flap 14a is then mounted in the center of the arc defined by shutter 106 to be movable therewith. In this way it is possible to change the direction of the drive force by displacing the assembly of 106 with 14a from about the fourth quadrant to about the first quadrant or vice versa.

Figure 7A:
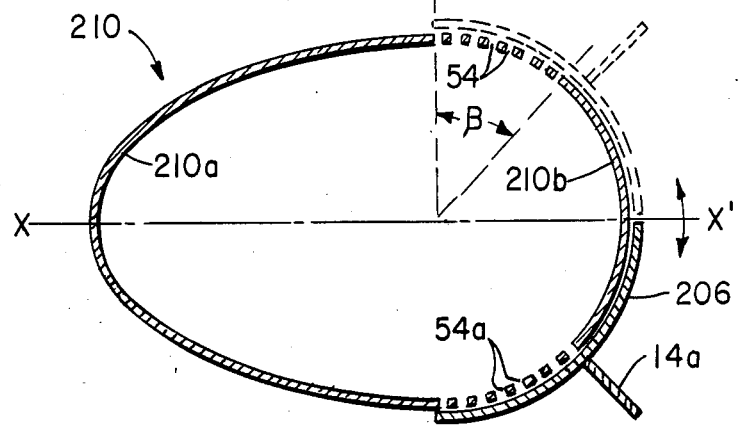
FIG. 7a shows diagrammatically in cross-sectional view the shape of an improved profile for use in the invention.

FIG. 7a shows diagrammatically an improved profile 210 for use in the arrangements described above. In this instance, the leading portion 210a is in the form of a semi-ellipse, which smoothly joins the trailing portion 210b formed as a semi-circle, the diameter of the semi-circle being equal to the minor diameter of the ellipse. In this example, the ellipse has a width-to-length ratio of about 0.5; that is, the minor diameter of the ellipse about is 0.5 times the major diameter. This leads to an overall width-to-length ratio for the profile of about 0.66.

As in the case of FIG. 6, two symmetrically located permeable regions 54, 54a are provided. In one form these regions extend between about 85° and 130° from axis XO, and have a porosity of between 20% and 50%, with a preferred value of about 30% to 40%. The flap 14a is carried on a circular-arcuate shutter 206, adjustable to permit selecting the quadrant for flap 14a and setting the inclination angle of flap 14a as desired, and also adapted to shift the operative permeable region from 54 to 54a and vice versa, by blocking the undesired permeable region.

Figure 16:
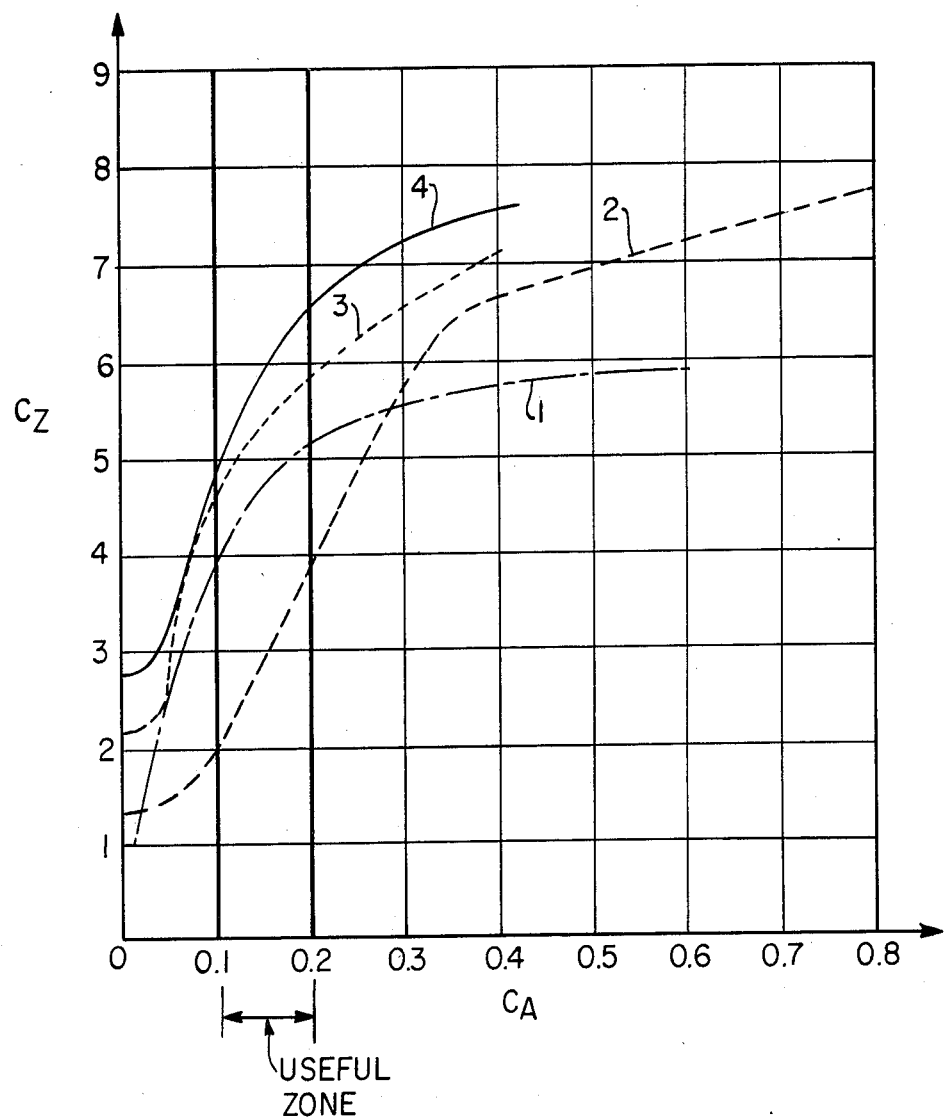
FIG. 16 shows a set of curves obtained in wind tunnel tests or real tests on a boat, showing the efficiency factors for various profile shapes.

The benefits of the invention will become more readily apparent from consideration of FIG. 16, which shows curves of Cz versus $C_A$ for a number of devices. All results illustrated in FIG. 16 have been obtained on systems for which body length-to-chord ratio was about 6. As will be evident, the steeper the curve, the greater will be the benefit to be obtained in increase of Cz from an increase in power expended. As a practical matter, it has been determined that, in order that the power expended on the fan to provide the pressure drop for suction should not be too large, the energy coefficient $C_A$ should not exceed 0.2. Moreover, values of Cz below 5 are of little practical value in relation to the costs involved and the benefits attainable. This causes the useful zone for $C_A$ to lie between about 0.1 and 0.2.

Curve 1 of FIG. 16 illustrates test results on the operation of a Magnus-effect rotor arrangement (without end plates). It will be seen that, within the useful zone of energy expenditure, this attains a lift coefficient Cz of between 4 and about 5.1.

Curve 2 shows corresponding results for a comparable aspirated circular cylinder, which supplies greater values of Cz than the Magnus-effect device for larger values of $C_A$, but within the useful zone is not as effective as the Magnus-effect apparatus, being limited to Cz between about 2 and 4. However, the arrangement illustrated in FIG. 7a provides results represented by curve 3, which will be seen to provide greater useful values of Cz (from about 4.5 up to nearly 6) for corresponding allowable energy expenditure.

Comparing curves 2 and 3 it will be seen that the leading portion of the profile makes it possible to reduce the suction energy expenditure necessary for creating the drive force in comparison to a circular profile. Thus, in the case of wind propulsion, if the angle of incidence i defined between the direction of the the wind and the axis of symmetry XX' of the profile of body 10 is equal to a value close to 30° to 35°, the expenditure of energy for suction across permeable area 54 of the rigid, cylindrical envelope 50 to attain Cz=5 can be reduced by about half compared with a body having a completely circular cross-section with the same projected surface area.

Figure 7B:
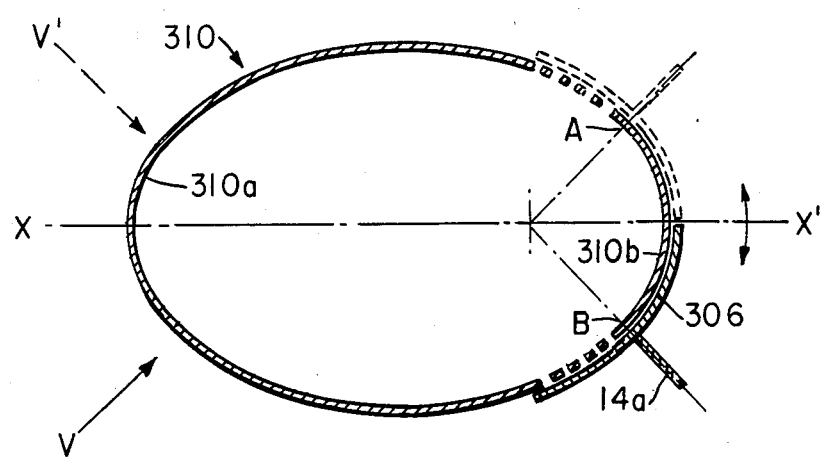
FIG. 7b shows diagrammatically in cross-sectional view the shape of a still further improved profile for use in the invention.

FIG. 7b shows a further modified profile 310 which has been found to provide enhanced effective drive force in relation to energy consumed, by up to 20% over the form of FIG. 7a. In this form, the profile 310 is again symmetrical about axis XX, with a trailing portion 310b formed partially of a circular arc AB. The rest of the trailing portion 310b, as well as the entire leading portion 310a are preferably in the shape of a partial ellipse, smoothly joining the circular arc AB. In a preferred specific form, the circular arc AB is symmetrical about axis OX' and subtends 90° about its center O. The center O is spaced from the tip of the leading portion 310a by about 74% of the total profile length, and the radius of the arc is about 26% of the profile length. This profile may be deemed to be derived from an ellipse having a ratio of minor diameter to major diameter of about 0.66, with a circular 90° arc inscribed in the end of the ellipse. The flap 14a is located about 35° from OX'. The shutter 306 may be circularly arcuate as before, with the provision of suitable conventional seals between it and the body 310, if needed, alternatively, the shutter may be made to conform in shape to the portion of the profile over which it lies, that is, to have an elliptical arcuate shape rather than a circular arcuate shape. Other shutter designs may be used.

This arrangement of FIG. 7b also has the advantage that the permeable zone may be reduced. For a porosity of about 45%, the permeable zone (as projected on axis XX') may extend from about 75% of the profile length from the leading portion tip to about 91% of the profile length, in comparison with the form of FIG. 7a, where the permeable zone extended about 63% to 88% of the length of the profile from the tip. This smaller permeable zone aids increasing the energy conservation of the device by further reducing the power required by the suction means to accomplish the necessary pressure drops within the body.

The performance of this FIG. 7b is illustrated in FIG. 16 by curve 4, which shows that for a given $C_A$, a substantially higher $C_Z$ is attained, or conversely for a given $C_Z$ substantially less energy is required for the fan in comparison to the other arrangements. An energy reduction of as much as 20% may thereby be attained over the FIG. 7a form for comparable drive force.

It will be understood that the various constructional variants of FIGS. 2 through 5, may be used with the profile forms of FIGS. 3, 6, 7a or 7b.

In practice, and as illustrated in FIGS. 8a to 8e, the profiles shown in FIG. 3, 6, 7a or 7b may be constructed as a body 10 comprising a rigid, circular cylindrical envelope 50 defining a substantially semi-circular trailing portion and a fairing 52 defining the leading portion of the profile of body 10. However, the presence of fairing 52 may become prejudicial, when the fluid flow speed V rises well beyond its normal value, such as may occur when the device according to the invention is fitted on board a ship for its propulsion. Thus, if a gale occurs, it is apparent that the increase in the effective cross-section and projected area of body 10 resulting from the presence of fairing 52 would increase the risk of damage to the device or to the ship in a gale.

In order to account for such exceptional conditions the design of the device may include features such as a fixed fairing and reinforced mechanical characteristics, or, alternatively, it is possible to provide for retracting the fairing when the need arises, in the manner illustrated in FIGS. 8a to 8e.

Thus, in the variant shown in FIG. 8a, fairing 52 defining the leading portion of the profile of body 10 is in the form of a single-walled, semi-rigid or flexible envelope 52a, made for example from cloth, which can be inflated or deflated at will by injecting a pressurized gas such as air into the space between envelope 52a and the circular cylindrical envelope 50, using suitable pumping means.

In the variant of FIG. 8b, the fairing is made in the form of a double-walled flexible envelope 52b. This variant differs from FIG. 8a in that the flexible envelope 52b is preshaped and its inflation takes place by injecting a pressurized gas such as air directly between the two walls of the envelope by using suitable pumping means.

The variant of FIG. 8c differs from the two previous variants in that there is no need for inflating the structure defining fairing 52. Thus, the fairing comprises a rigid ferrule 52c having a circular arc-shaped cross-section, whose radius is substantially identical to that of the cylindrical envelope 50. The rigid fairing 52c is arranged symmetrically with respect to the axis of symmetry XX' of the profile of body 10 and can move in the direction defined by axis XX', e.g. under the action of jacks (not shown) between an operating position (shown by solid lines in FIG. 8c) in which it is remote from the cylindrical envelope 50 and a retracted position (shown by broken lines) in which it is adjacent to envelope 50. The remainder of fairing 52 is constituted by two flexible partitions 152c, for example made from cloth, arranged substantially tangentially to the cylindrical envelope 50 for connecting the latter to the two ends of the circular arc defined in cross-section by ferrule 52c.

In order to improve the aerodynamic efficiency of the variant of FIG. 8c, it may be advantageous to eliminate the angles formed between the cylindrical envelope 50, the flexible partitions 152c and the rigid ferrule 52c. To this end, the flexible envelopes 152c may be inflated in the same way as in the variants of FIGS. 8a and 8b. This inflation may be brought about either by using flexible, single-walled partitions 152c and injecting a pressurized gas into the space defined between envelope 50, partitions 152c and ferrules 52c by using suitable pumping means, or by using double-walled, flexible partitions 152c and injecting a pressurized gas between the two walls of such partitions.

The variant of FIG. 8d differs from the preceding variants in that the leading portion of the profile of body 10 is disconnected from the fixed cylinder 50, while the shape of the fairing differs in accordance with the direction which is to be given to the drive force. Thus, fairing 52 is constituted by a flexible or semi-rigid, cloth beak-shaped projection 52d held taut between two supports 152d and 152d'. These supports may be in particular constituted by masts, lines or rollers. Supports 152d and 152d' are parallel to one another and parallel to the axis of cylindrical envelope 50 or are slightly inclined with respect to that axis, e.g. substantially vertical in the case when the device according to the invention is used as the propulsion means for a boat or ship. More specifically, support 152d is disposed on axis XX' of the profile of body 10, while support 152d' is displaced from the axis on the side towards which it is desired to create the drive force (i.e. the leeward side). Moreover, support 152d' is spaced from cylindrical envelope 50, but is much closer to the latter than support 152d, so that a gap effect is created between the beak-shaped projection and the envelope.

In order to permit a reversal of the direction of the drive force created by the device of FIG. 8d, e.g. in order to permit tacking and steering when the device is used for the propulsion of a ship, it is desirable to be able to arrange a flexible beak-shaped projection symmetrically to that shown in solid line in FIG. 8d, with respect to axis XX'. To this end, support 152d may be positioned in a plane perpendicular to the axis of symmetry XX' and may be disposed substantially tangentially to cylindrical envelope 50. As a result of this arrangement, it is apparent that the direction of the drive force may be reversed by modifying the orientation of body 10 to define an equal and opposite angle of incidence i, as in the other variants, and by moving mast 152d' into a position symmetrical with respect to axis XX', so that the flexible beak-shaped projection 52d then occupies the position shown by broken lines in FIG. 8d.

According to another variation, not shown, it is possible to have from the outset two symmetrical, flexible, beak-shaped projections attached respectively to mast 152d and to two masts 152d' symmetrical with respect to axis XX'. The unused projection 152d is then bent back, while the other is taut.

In both cases when the speed of the moving fluid becomes too high, the beak-shaped projection or projections 52d may be simultaneously folded back, e.g. by lowering them along the masts when the latter are vertical or by winding them onto a supporting roller 152d.

As shown by broken lines in FIG. 8d, supports 152d and 152d' may be fixed or supported at each of their ends by end disks 36, which may be arranged at the ends of body 10, as will be shown hereinbelow.

The variant shown in FIG. 8e is derived from the variants of FIGS. 8c and 8d. Thus, in FIG. 8e, fairing 52 comprises two rigid beak-shaped projections 52e each on a respective side of axis XX'. Each of the projections 52e has a circular arc-like cross-section and its ends can move parallel to axis XX', but over different distances, specifically under the action of jacks (not shown), between a retracted position adjacent to the outer surface of cylindrical envelope 50 and an operating position remote from said surface and in which the projection and the envelope create a slot effect. As in the case of FIG. 8d, the rigid beak-shaped projection 52e located on the side of axis XX' towards which it is desired to create the drive force is normally in the operating position, while the other projection 52d is in the retracted position. When the orientation of body 10 is modified so as to reverse the direction of the drive force, it is apparent that the positions occupied by the projections 52e are interchanged. Obviously, when the speed V of the moving fluid becomes too great, the two projections 52e are brought into the retracted position.

In another variation, not shown, the fairing defining the leading portion and the semi-circular part defining the trailing portion of the body 10 are constructed in a telescopic manner, in such a way that their length can be reduced when the fluid flow rate increases to an excessive extent. Thus, body 10 can be made either in the form of a plurality of rigid, telescopic parts, or at least in its median part by means of a flexible envelope, whose length can be modified at will. The control of length variation can be carried out by any known means and in particular by means of winches.

As in earlier figures, FIGS. 8a to 8d show pressure reduction created by means of a permeable area 54 formed on the surface of body 10, the fluid streams on the outer and inner profile surfaces being separated by means of a flap 14a, which can be planar or have any other profile shape.

For structural reasons, the bodies 10 used according to the present invention preferably have a length of approximately five to six times the diameter or profile length (i.e. chord). Such a length limitation has the double effect of reducing coefficient Cz and consequently the drive force, as well as producing a supplementary resistance (called the induced resistance) which is directly proportional to the square of this coefficient. In order to reduce these effects which, in the present invention, become increasingly unfavorable as the coefficient Cz becomes higher (above 3), it is proposed that at the ends of body 10 guard plates or circular disks 36 be provided, which have a diameter larger than that of the body, as illustrated in FIGS. 9a to 9e. These disks 36 increase the effective length and consequently reduce the induced resistance, while preventing any cancelling out of the the drive force at the ends of body 10.

However, the efficiency of these disks may be reduced because the fluid which passes around the outer surface of body 10 adjacent the disks may be slowed down by friction against these disks. In order to reestablish a fluid flow in the end regions of body 10 which is the same as in the median regions thereof, different constructional embodiments are proposed with reference to FIGS. 9a to 9e. In these drawings, body 10 has again been shown as having a circular cross-section in order to simplify the illustration, but it is understood the body 10 may have an elongated profile, as described above and below.

Thus, in the case of FIG. 9a the disks 36 are integral with a shaft 38 received in bearings 40, in such a way that the disks are driven by conventional means (not shown) in the direction of the upper surface fluid flow at circumferential speeds which are well above the fluid flow speed outside body 10. In this case, the suction fan is in the bottom part of the body.

In the variants of FIGS. 9b to 9e, hollow disks 36 are integral with body 10. Thus, as illustrated in FIG. 9b, the same effect may be obtained by carrying out tangential blowing with respect to the disks around the side of body 10, as from each of the disks and through a radial slot 42. Like the tangential blowing 12b in FIG. 2c, this blowing takes place in the direction of and within the fluid flow on the outer surface.

The variant of FIG. 9c shows the case where tangential blowing is carried out by a member 44 carried by disk 36 and arranged radially with respect to the latter.

Instead of carrying out tangential blowing with respect to disks 36, blowing may be performed in the manner illustrated in FIG. 9d in the form of a jet in a perpendicular direction with respect to disks 36 and in the direction of the length of body 10, through an opening 46 formed in each of the disks. Preferably, this blowing takes place in the outer surface fluid flow in the vicinity of flap 14a and in this way is particularly effective.

Finally, in FIG. 9e the fluid flow may be improved along disks 36 by sucking the fluid circulating around the body 10 through openings 48 or any other suitable permeable system formed in hollow disks 36. Preferably, these openings 48 are aligned with the permeable area (FIG. 2a) provided in body 10.

Obviously, the arrangements shown in FIGS. 9b to 9e may be combined in any desired way.

As stated above, although body 10 is shown in FIGS. 9a to 9e as having a circular cross-section, it is obvious that these solutions are applicable to a profile of the type illustrated in FIGS. 3, 6, 7a and 7b.

Figure 10:
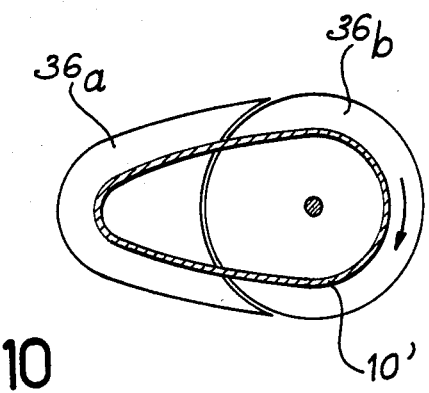
FIG. 10 shows diagrammatically a cross-section of a constructional variant of a plate placed at the ends of the body of the device, the profile of the leading portion of the body being elongated in accordance with the invention.

The shape of the end disk may be adapted to the shape of the profile in such a way that the disk projects for a given distance all around the profile. In the case of the rotary disk shown in FIG. 9a, it should be noted in the manner illustrated in FIG. 10 that disk 36 may be made in two parts 36a, 36b, which are complementary. Only part 36b, which has a circular configuration and which is placed alongside the trailing profile portion, is rotated.

Obviously, the suction and blowing means described hereinbefore, both in connection with body 10 and disks 36, can be advantageously determined in such a way that the suction flow rate is equal to the blowing flow rate, making it possible to use a single suction-blowing machine for the complete device. Thus, and in a nonlimitative manner, it is advantageously possible to combine the embodiment of FIG. 2a which only uses suction means with one of the variants according to FIGS. 9b and 9d using blowing means.

In this connection, it has been observed that the energy expended during the blowing of the fluid out of the body, which necessarily implies a suction of the fluid into the body, is prejudicial to the energy efficiency of the device, even if this is carried out under favorable aerodynamic conditions. However, the relatively large thickness of the profile body 10 makes it possible to define a large vacuum chamber within the body 10, which contributes to reducing the pressure drop for suction and consequently to reducing the expenditure of energy. Moreover, various configurations may bring about a desirable reduction in the pressure drop occurring during blowing.

Figure 11:
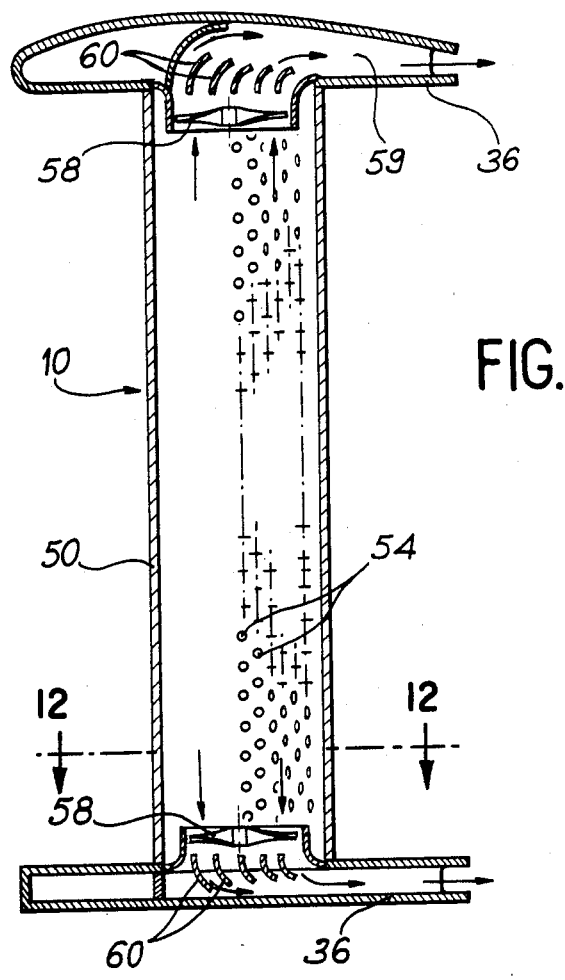
FIG. 11 shows a side elevational view partly in section of an embodiment of the device according to the invention in which a fan is placed at each of the ends of the elongated body in order to suck the fluid into the body.
Figure 12:
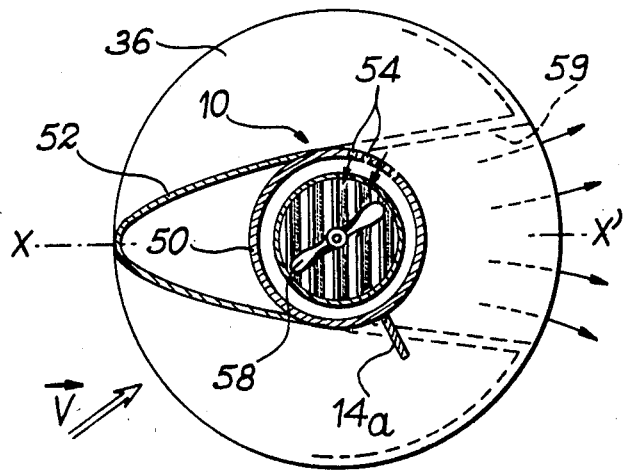
FIG. 12 shows a cross-sectional view along line XII—XII of FIG. 11.

Thus, FIGS. 11 and 12 show one embodiment of a device providing the suction according to the invention. For the purposes of simplifying the description, the fairings described with reference to FIGS. 8a to 8e are not shown in FIGS. 11 and 12, but it is readily apparent that all the variants described relative to FIGS. 8a to 8e may be used in this case.

As shown in FIGS. 11 and 12, the hollow cylindrical envelope 50 of body 10 comprises, in the vicinity of each of its ends, a fan 58 which sucks the external fluid, such as air, through the permeable area 54 (indicated diagrammatically by holes in FIG. 3) and then transfers the fluid into the disks 36 which, to this end, have a double-walled configuration. As can be seen with particular clarity from FIG. 12, the fluid introduced into each of the disks 36 by fans 58 is transferred to the outside by a circular arc-shaped opening 59 formed on the circumference of each of the disks, preferably on the trailing side. In a variant (not shown), the disks may be mounted in a rotary manner in order to permit an orientation of the blowing area. Obviously, in order to bring about a maximum limitation of the pressure drop occurring at the fluid ejection point on the circumference of the disks, the passage cross-section within the latter is made relatively large and deflectors 60 are provided at the connection between body 10 and disks 36.

In a variant, not shown, a fan may be provided at only one of the ends of envelope 50. In addition, each fan may be replaced by a group of fans.

In order to take account of the variable nature of the suction force along the body 10 resulting from the arrangement of fans 58 at the ends of the latter, the permeability of area 54 may be modified, or a system of blades or any other equivalent system may be provided with body 10. Thus, the permeability of area 54 may be greater in the parts remote from fans 58, i.e. in the center of body 10, than in the parts close to the said fans, i.e. in the vicinity of the ends of body 10.

Although the embodiment of FIGS. 11 and 12 may be used with all the fairing types described hereinbefore, it is apparent that it is particularly well suited to a variant (not shown) according to which body 10 is telescopic, because the positioning of the fans at the ends of body 10 makes it possible to reduce the length of the body in the intermediate area between the said fans.

In the embodiment of FIGS. 13 and 14, the interior of the envelope constituting body 10 is subdivided into two compartments 63a, 63b in the lengthwise direction by a planar partition 62 radially disposed in the plane defined by axis XX'. Over its entire length, partition 62 has circular openings 64 housing fans 66, whose axes are parallel to one another and intersect the axis of cylindrical part 50 of body 10 in a direction perpendicular to the axis XX' of the profile of the latter. This feature is particularly clearly shown in FIG. 14, which also shows fairing 52, which can be constructed with any of the variants shown in FIGS. 9a to 9e and 10. For reasons of clarity, fairing 52 is not shown in FIG. 13.

It can be seen that the compartments 63a and 63b defined within the cylindrical envelope 50 alternately form suction and blowing compartments, according to whether fans 66 rotate in one or the other direction. In this configuration, it is consequently necessary to add to permeable area 54 a fluid exit or blowing area 68 and to place these two areas on cylinder 50 on either side of partition 62. As indicated hereinbefore, a permeable area 68 is preferably arranged in the outer profile surface fluid flow in the vicinity of flap 14a. Moreover, in order to limit the pressure drop at the blowing area 68 which may lead to a relatively unsatisfactory increase in the expenditure of energy, blowing area 68 is given a maximum cross section, while taking account of the desired fluid flow characteristics.

In order to permit a reversal of the direction of the drive force direction produced in this way, it is clear that it is necessary to provide the capability of reversing the direction of rotation of fans 66. In addition, a suction area and a blowing area must be provided on either side of partition 62. Finally, means should be provided for alternately covering the suction area and blowing area on one or the other side of partition 62. Thus, it is apparent from FIG. 14 that suction areas 54 may be provided by means of pivoted panels opening towards the inside of the fixed cylinder 50 and to provide blowing areas 68 by means of pivoted panels opening towards the outside of cylinder 50. Thus, as a function of the rotation direction of fans 66, the vacuum produced in a compartment 63a or 63b has the effect of opening the pivoted panels of the corresponding suction area 54 and closing the pivoted panels of the corresponding blowing area 68, while the overpressure produced in the other compartment 63b or 63a respectively has the effect of closing the pivoted panels of the corresponding suction area 54 and opening the articulated panels of the corresponding area 68. Obviously, the opening and closing of the suction and blowing areas may be obtained by any other means and in particular by rotary ferrules as described with reference to FIGS. 5a to 5c and as can be the case in the embodiments of FIGS. 11 and 12.

In a variant not shown, the suction and blowing areas arranged on either side of partitions 62 may constitute a single area used alternately for suction and blowing, in correspondence with the rotation direction of the fans.

Figure 15:
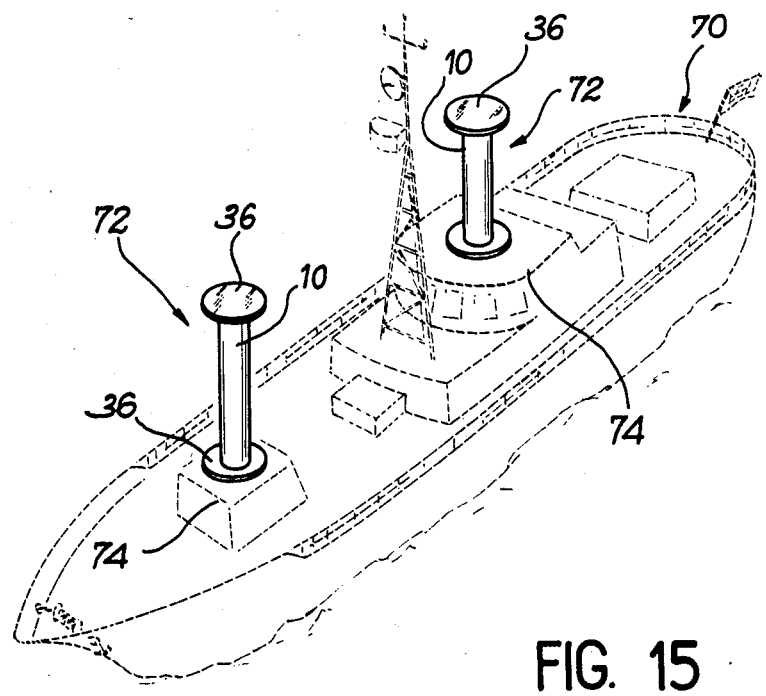
FIG. 15 shows diagrammatically an installation of two devices in accordance with the invention positioned on a ship.

As stated above, the device according to the invention may be used both for controlling the movement of a moving object such as a ship and for creating energy, particularly electric energy or power by using it for driving an alternator. For illustrative purposes, FIG. 15 shows a ship 70 equipped with two devices 72 constructed in accordance with the invention. In FIG. 15, these devices are constituted by vertical cylinders forming bodies 10, the cylinders being provided at each of their ends with a disk 36. According to the invention, each cylinder is equipped with a fairing on the leading portion to produce the desired elongated thick profile, but this fairing is not shown in order to simplify the illustration. It should also be noted that each of the devices 72 is preferably placed on a platform 74 carrying the systems shown in FIGS. 9a to 9e associated with the lower end disks 36. Moreover, platforms 74 enable devices 72 to benefit from an image effect which doubles the effective geometrical length of bodies 10, making each function like a much longer body, thereby making it possible to reduce the induced resistance (drag).

Obviously, in such an application, as in most other applications, it is advantageous to provide means making it possible to detect the direction of the wind or other fluid. These detection means may act in per se known manner to actuate a servo control for automatically orienting axis XX' of body 10 in accordance with a given angle of incidence i with respect to the wind direction.

In the application of the devices according to the invention to the production of energy, illustratively several of the described devices may be placed either vertically or horizontally relative to one another in a place exposed to the wind or other fluid in order to form a closed circuit along which the devices move under the action of the wind about a fixed point in order to drive a generator and produce an electric current. It is also possible to use this device as the single component of a horizontal-axis, double-bladed wind-driven electric generator. The rotation of the device about this axis in the manner of a blade, resulting from the production of a drive force in the direction corresponding to this rotation, may also be used for directly driving a generator. In this case, the rotation of the device forming the blade occurs automatically due to the spinning of the flap, and air is sucked inside under the effect of the centrifugal force and transferred towards its peripheral ends. Bearing in mind the high value of the drive force produced by such a device, it is readily apparent that this winddriven electric generator with a single element makes it possible to obtain an effect comparable to that of a conventional multi-blade wind-driven electric generator. Finally, the device according to the invention could also be used for replacing the conventional blades or vanes of rotary or propulsion means of the most varied types.

Obviously, the invention is not limited to the specific embodiments described above as examples and in fact the invention includes all variants thereof. Thus, the profile of body 10 may vary from one end to the other thereof. In the same way, the positioning of the various systems constituting the suction means, blowing means and flaps may differ and may be gradiated from one end to the other of body 10. To this end, body 10 may be subdivided into a plurality of sections, which may be oriented independently of one another. The flaps may also be made from a flexible material, which may occupy different positions from one end to the other of body 10.

What is claimed as the invention is:

1. A device which is to be placed in a fluid moving in a first direction in order to produce a drive force in a second direction which is substantially transverse with respect to the first direction, wherein said device comprises an elongated body having in cross-section a rounded and symmetrical profile with respect to an axis of symmetry which defines with the first direction an angle of incidence in the second direction, said profile defining a rounded and elongated leading portion whose thickness increases from the front to the rear and a rounded trailing portion whose thickness decreases from the front to the rear, the maximum thickness of the profile being between 50 and 100% of its length in the direction defined by its axis of symmetry, the leading portion being longer than the trailing portion, the device also comprising means for sucking the fluid into the body in a suction area located on a first side of the profile on which said force is to be produced, at least on the trailing portion of the profile, and at least one flap which projects with respect to the body, said flap being located on the trailing portion of the profile, on a second side of the profile opposite to said first side.

2. A device according to claim 1, wherein it comprises means for orienting the axis of symmetry defined by the profile of the body in accordance with a given angle of incidence with respect to the first direction.

3. A device according to claim 1, wherein the trailing portion of the profile is semicircular.

4. A device according to claim 1, wherein the body has at least one retractable part located at its elongated leading portion.

5. A device according to claim 4, wherein the body comprises at least one rigid, cylindrical envelope defining the trailing edge and a retractable fairing defining the leading portion.

6. A device according to claim 5, wherein said fairing comprises an inflatable envelope positioned outside the cylindrical envelope.

7. A device according to claim 6, wherein said envelope comprises a single flexible wall, and means are provided for introducing a pressurized gas into a volume defined between said wall and said cylindrical envelope.

8. A device according to claim 6, wherein said envelope comprises a double, flexible and preshaped wall, and wherein means are provided for introducing a pressurized gas into a volume defined in said double wall.

9. A device according to claim 5, wherein said fairing comprises a rigid ferrule having a circular arc-shaped cross-section and arranged symmetrically with respect to said axis of symmetry, externally of said cylindrical envelope, and two partitions connecting the rigid ferrule to the cylindrical envelope, and wherein means are provided for displacing the rigid ferrule in accordance with the direction defined by said axis of symmetry between an operating position in which the ferrule is remote from the cylindrical envelope and a retracted position in which the ferrule is adjacent to the cylindrical envelope.

10. A device according to claim 9, wherein each of said partitions comprises a single flexible wall, and wherein means are provided for introducing a pressurized gas into a volume defined between said cylindrical envelope, said rigid ferrule and said flexible wall.

11. A device according to claim 9, wherein each of said partitions comprises a flexible and preshaped double wall, and wherein means are provided for introducing a pressurized gas into a volume defined in said double wall.

12. A device according to claim 5, wherein said fairing comprises at least one flexible beak-shaped projection positioned externally of the cylindrical envelope between a first support extending substantially parallel to the axis of said cylindrical envelope and passing through said axis of symmetry and a second support extending substantially parallel to the first support and placed on said first side of the profile, at a given distance from the cylindrical envelope, in such a way that the flexible beak-shaped projection defines the leading edge of the profile of the body and causes a slot effect with the cylindrical envelope.

13. A device according to claim 12, including means for moving said second support from one side of the profile to the other, with respect to said axis of symmetry, according to the side on which said carrying force must be produced.

14. A device according to claim 12, wherein means are provided for displacing said flexible beak-shaped projection with respect to at least one of said supports, in order to modify the surface of said projection.

15. A device according to claim 12, wherein said fairing comprises two flexible beak-shaped projections arranged symmetrically with respect to said axis of symmetry between said first support and two second supports, arranged symmetrically with respect to said axis of symmetry.

16. A device according to claim 14, wherein said fairing comprises two rigid beak-shaped projections having a circular arc-shaped cross-section and arranged on either side of said profile, with respect to said axis of symmetry, outside the rigid cylindrical envelope, and wherein means are provided for alternatively displacing each of said rigid beak-shaped projections in a direction parallel to said axis of symmetry between an operating positionn in which the projection is remote from the cylindrical envelope and a retracted position in which the projection is adjacent to the cylindrical envelope, said means acting so as to place the rigid beak-shaped projection on said first side of said profile in the operating position and the other rigid beak-shaped projection in the retracted position.

17. A device according to claim 1, wherein the body comprises at least two coaxial envelopes, at least one of the said envelope portions being impermeable to the fluid, orientable, and having in section at least one slot defining said suction area, while the other envelope is permeable to the fluid.

18. A device according to claim 17, wherein the body comprises two fluid-impermeable envelopes, which are orientable independently of one another, so as to permit a regulation of the width of said slot.

19. A device according to claim 17, wherein the body comprises an impermeable envelope defining two permeable suction areas, which are symmetrical with respect to the axis of the profile, and an orientable, circular arc-shaped, impermeable envelope, which hides one or the other of said suction areas.

20. A device according to claim 1, wherein the body comprises at least one impermeable envelope provided with gates which open towards the inside for defining suction areas.

21. A device according to claim 1, wherein it comprises two rigid flaps, which are movable with respect to the body so as to be able to occupy an inactive position in which they do not modify the profile of the body, said two flaps being positioned symmetrically with respect to the axis of symmetry of the profile in such a way that one is in the inactive position when the other projects with respect to the body and vice versa, in accordance with the side of the profile on which said drive force is to be produced.

22. A device according to claim 21, wherein the flaps are substantialy planar and are positioned radially with respect to the body, whereby they can be retracted by sliding parallel to themselves into slots formed in the body.

23. A device according to claim 1, wherein it comprises two inflatable flaps positioned symmetrically with respect to the axis of symmetry of the profile in such a way that one of said flaps is deflated while the other is inflated and vice versa, in accordance with the side of the profile on which said force is to be produced.

24. A device according to claim 1, wherein it comprises a single substantially planar, rigid flap, positioned substantially radially with respect to the body, said flap being movable with respect to the body from one side of said profile to the other, with respect to the axis of symmetry of the profile, on the trailing portion of said profile, in accordance with the side of the profile on which said drive force is to be produced.

25. A device according to claim 21, including means for turning said flaps down onto the body, so as to adopt the profile of the latter.

26. A device according to claim 1, wherein a disk is fitted to each end of the body.

27. A device according to claim 26, wherein each of the disks is integral with the body and comprises, on its surface adjacent to said body, means for sucking fluid into the body in an area located on said first side of the profile, at least on the trailing portion of the latter.

28. A device according to claim 24 or 26, wherein at least one fan, whose axis is parallel to the longitudinal axis of the body, is placed within said body in the vicinity of at least one of its ends, in order to suck the fluid towards the interior of the body through the suction area and blow said fluid towards the outside.

29. A device according to claim 28, including means for causing said fan to blow the fluid to at least one circular arc-shaped opening formed on the circumference of the corresponding disk.

30. A device which is to be placed in a fluid moving in a first direction in order to produce a force in a second direction which is substantially transverse with respect to the first direction, wherein said device comprises an elongated body having in cross-section a rounded and symmetrical profile with respect to an axis of symmetry which defines with the first direction an angle of incidence, said profile defining a rounded and elongated leading portion whose thickness increases from the front to the rear and a rounded trailing portion whose thickness decreases from the front to the rear, the maximum thickness of the profile being between 50 and 100% of its length in the direction defined by its axis of symmetry, said elongated body comprising an impermeable envelope having two permeable suction areas which are symmetrical with respect to said axis of symmetry and located at least on the trailing portion of the profile, and a circular arc-shaped, impermeable envelope portion, which is orientable in order to cover one of said suction areas located on a side of the profile opposite to the side on which said force is to be produced, said device further comprising means for sucking the fluid into the body through the other of said suction areas, and a single substantially planar, rigid flap, which projects radially with respect to the body, said flap being carried by said impermeable envelope portion in order to form an assembly with the latter, and said flap being located on the trailing portion of the profile, on said side of the profile opposite to the side on which said force is to be produced, whereby the direction of said force can be changed by displacing said assembly from one side of the profile to the other.

31. A device adapted to be placed in a fluid moving in a first direction for producing a force in a second (force) direction substantially transverse to said first direction, comprising an elongated body having in cross section a rounded profile symmetrical with respect to an axis of symmetry and having a leading portion increasing in width along said axis of symmetry from the tip of said leading portion to a maximum width and having a trailing portion decreasing in width along said axis from said maximum width to the end of said trailing portion, means located symmetrically on both sides of said axis of symmetry and at the trailing portion of said profile for controlling the boundary layer of said fluid over the surface of said body to cause said fluid to flow smoothly over said body surface, a flap extending outwardly from said body and adjustable over said profile trailing portion to positions on either side of said axis of symmetry, and means for rendering said boundary layer control means ineffectual on one side of said axis of symmetry and for adjusting said flap to a position at said one side.

32. A device as in claim 31 wherein said profile is elongated and said leading portion is longer than said trailing portion in the direction of said axis of symmetry.

33. A device as in claim 32 wherein the maximum width of said profile transverse to said axis of symmetry is between 0.5 and 1.0 times the length of said profile along said axis.

34. A device as in claim 32 wherein said profile trailing portion has a section which is substantially in the shape of a circular arc.

35. A device as in claim 34 wherein said flap has a length of 0.5 to 1.0 times the radius of curvature of said circular arc.

36. A device as in claim 34 wherein said circular arc section constitutes only a part of said profile trailing portion.

37. A device as in claim 34 where the remainder of said profile is substantially in the shape of a partial ellipse.

38. A device as in claim 34 wherein said profile trailing portion is substantially a semi-circular arc.

39. A device as in claim 38 wherein said profile leading portion is substantially in the shape of a half-ellipse.

40. A device as in claim 31 wherein said body is hollow and said boundary layer controlling means includes two symmetrically positioned fluid-permeable regions on said body located at least at the trailing portion of the profile, on respective sides of said axis of symmetry.

41. A device as in claim 40 where said boundary layer controlling means also includes means for selectively aspirating fluid into the body through one or another of said permeable regions.

42. A device as in claim 40 urther including an adjustable arc-shaped impermeable envelope adapted to cover one or the other of said permeable regions on a side of said profile facing opposite to said second (force) direction.

43. A device as in claim 42 including means for adjusting said flap together with said arc-shaped envelope.

44. A device adapted to be placed in a fluid moving in a first (fluid) direction for producing a force in a second (force) direction substantially transverse to said first direction comprising an elongated body having in cross-section a rounded profile symmetrical with respect to an axis of symmetry, said profile having a leading portion increasing in width along said axis of symmetry from the tip of said leading portion to a maximum width and having a trailing portion decreasing in width along said axis from said maximum width to the end of said trailing portion, said leading portion being elongated and longer than said trailing portion in the direction of said axis of symmetry, and a flap extending outwardly from said body along said trailing portion on one side of said axis of symmetry.

45. A device as in claim 44 wherein said trailing portion has a shape including a substantially circular arc.

46. A device as in claim 44 wherein the maximum width of said profile transverse to said axis of symmetry is between 0.5 to 1.0 times the length of said profile along said axis.

47. A device as in claim 44 further including means for selectively setting said flap on either side of said axis of symmetry.

48. A device as in claim 45 wherein said flap has a length of 0.5 to 1.0 times the radius of curvature of said circular arc.

49. A device as in claim 45 wherein said profile has a shape formed substantially of a semi-circular arc and a semiellipse smoothly joined to said arc.

50. A device as in claim 45 wherein said profile has a shape formed substantially of a circular arc and a partial ellipse smoothly joined to said arc.

51. The method of operating a device as in claim 44 comprising the step of orienting the device to have an incidence angle of over 30° between the axis of symmetry and the fluid direction.

52. The method as in claim 51 wherein said angle is 30° to 35°.

53. The method as in claim 51 further including orienting said flap to have an angle of up to 45° with respect to said axis of symmetry.

54. The method as in claim 53 where said flap angle is 35° to 45°.

55. The method of operating a device as in claim 31 having boundary layer control means including a fluid-permeable region on said body, comprising the steps of aspirating fluid through said fluid-permeable area to produce a coefficient of energy expenditure ($C_A$) of between 0.1 and 0.2.

56. The method of operating a device as in claim 31 having a permeable region on its body, comprising the steps of operating the device to have an incidence angle of over 30° between the axis of symmetry and the fluid direction, operating said flap to have an angle of 35° to 45° with respect to the axis of symmetry, and aspirating fluid through said permeable area and adjusting said aspirating to produce a coefficient of energy expenditure of between 0.1 and 0.2.

* * * * *